United States Patent [19]
Sailers

[11] 3,712,041
[45] Jan. 23, 1973

[54] APPARATUS FOR SMOKE CONTROL

[76] Inventor: Young T. Sailers, C-15 Atlanta Road, Gainesville, Ga. 30501

[22] Filed: Jan. 29, 1971

[21] Appl. No.: 110,804

[52] U.S. Cl..................55/228, 55/229, 55/DIG. 30
[51] Int. Cl. ............................................B01d 53/14
[58] Field of Search..........55/84, 85, 89, 90, 94, 228, 55/242, 260, DIG. 30; 261/126, DIG. 9

[56] References Cited

UNITED STATES PATENTS

| | | | |
|---|---|---|---|
| 2,380,826 | 7/1945 | Dorfan | 261/126 |
| 3,282,047 | 11/1966 | Wertheimer | 55/DIG. 30 |
| 1,650,292 | 11/1927 | Miscampbell | 261/126 |
| 3,605,386 | 9/1971 | Erwin et al. | 55/228 |

Primary Examiner—Charles N. Hart
Attorney—Newton, Hopkins & Ormsby

[57] ABSTRACT

An apparatus for use in controlling smoke expelled from an exhaust stack to prevent pollution of the atmosphere by the smoke being exhausted therefrom. Fog generating means is supported on the stack above the exhaust opening for generating a moisture laden fog around the opening whereby moisture will saturate the smoke exhausted therefrom to cause the smoke to fall by gravity from the atmosphere. The fog generating means includes means for collecting and filtering the moisture saturated smoke and reusing the filtered moisture in the fog generating means.

4 Claims, 2 Drawing Figures

PATENTED JAN 23 1973

3,712,041

INVENTOR.
YOUNG T. SAILERS
BY
Newton, Hopkins, & Ormsby
ATTORNEYS

APPARATUS FOR SMOKE CONTROL

BACKGROUND OF THE INVENTION

The present invention relates to an anti-pollution control apparatus. More particularly, this invention relates to a fog generating attachment, adapted to be supported on a conventional exhaust stack means, for saturating smoke being expelled from the exhaust stack causing the saturated smoke to fall from the atmosphere by gravity.

One of the major sources of air pollution is created by the many smoke exhaust stacks which expel tremendous amounts of smoke into the atmosphere causing undesirable pollution of the air. The smoke exhaust stacks are more numerous around a large metropolitan area where a number of burning incinerator means are used for disposing of garbage, where industrial plants utilize certain combustion processes having smoke exhaustion means, where steam generating power plants utilize large numbers of combustion chambers to make steam and still other incinerator means all of which expel large amounts of smoke in our atmosphere.

There have been numerous attempts to devise certain filter means for use in filtering exhaust smoke from burning incinerator means. However, most of the prior art smoke filter means are complicated in nature, expensive to install and unreliable in operation. Certain of the prior art filter means utilized to remove unwanted residue from air includes means for developing a water barrier through which the air must pass thereby depositing the unwanted residue in the streams of water. The prior art water filter means requires excessive amounts of hardware to produce an operable filter means and due to the excessive amount of hardware required, the prior art water filter means could not easily be installed of applied to existing smoke exhaust stack means.

SUMMARY OF THE INVENTION

The above disadvantages of the prior art filter means have been overcome by the present invention which basically includes a conduit means having a number of angularly displaced vertically spaced nozzles which are connected in fluid flow communication with a water pressure producing means whereby water can be forced under pressure through the nozzles to create a circular array of moisture laden fog. An important feature of the present invention is directed to the concept of supporting the fog generating means above a smoke stack whereby the circular array of moisture laden fog will be generated around an exhaust opening causing smoke expelled through the exhaust opening to be saturated with the moisture laden fog thereby falling by gravity from the atmosphere. A cover means is supported on the smoke stack between the exhaust opening and the fog generating means to prevent moisture from falling into the exhaust opening. Another feature of the present invention includes means for catching the saturated smoke, filtering residue from the moisture and reusing the moisture in the fog generating operation.

Therefore, a primary object of this invention is to provide an improved apparatus for controlling pollution of smoke in our atmosphere.

Another object of this invention is to provide an apparatus for removing smoke from our atmosphere by saturating the smoke with moisture laden fog.

A still further object of this invention is to provide a fog generating apparatus which can be easily attached to a conventional exhaust stack for generating a circular array of moisture laden fog around the exhaust opening of the smoke stack.

A still further object of this invention is to provide an apparatus for removing smoke from the atmosphere by saturating the smoke with moisture laden fog including catching the saturated smoke, filtering the smoke residue, and reusing the moisture to saturate still other smoke in the atmosphere.

Another object of this invention is to provide a smoke control apparatus having means to prevent unwanted transportation of the smoke into the atmosphere by air currents.

An additional object of this invention is to provide a smoke control apparatus which is simple in construction, economical to manufacture and reliable in operation.

Still other objects and advantages of the details of construction will become apparent upon reading the accompanying specification of the illustrative embodiments with reference to the attached drawings wherein like reference numerals have been used to refer to like parts throughout the several figures, and wherein:

DESCRIPTION OF THE ILLUSTRATIVE EMBODIMENT

Figure 1:
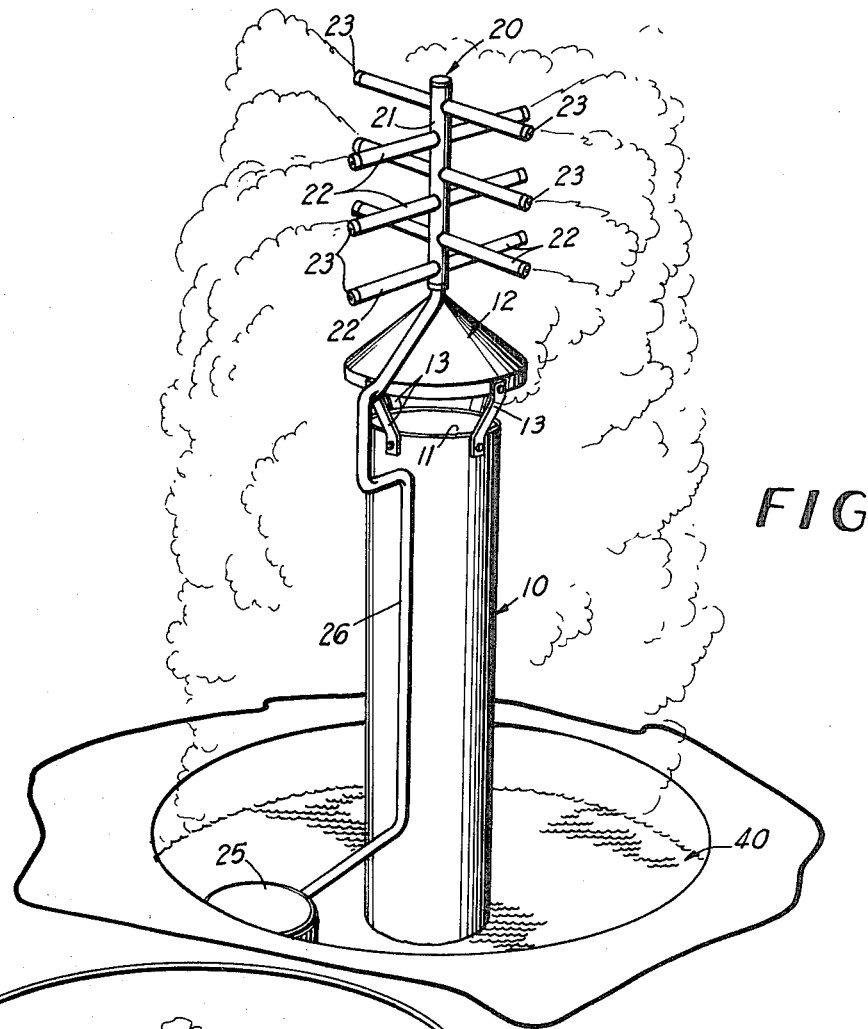
FIG. 1 is a perspective view of the smoke control apparatus of the present invention.

Referring now to the drawings, the present invention will be described with reference to a smoke exhaust stack means 10, a fog generating means 20, and a reservoir catch basin 40.

As shown in FIG. 1, the smoke exhaust stack 10 is of a conventional upright cylindrical construction which is in flow communication with a conventional combustion means (not shown). The upper end of the exhaust stack 10 is provided with an exhaust opening 11. A cover means 12 is supported on the exhaust stack 10 above the exhaust opening 11 to prevent moisture from falling into the exhaust opening. The cover 12 is formed of a conical shaped element having downwardly diverging surfaces which will allow moisture dropped thereon to be conveyed by gravity over an outer edge which is displaced outwardly from the exhaust opening 11. The diameter of cover 12 is detailed to be slightly greater than the diameter of the exhaust opening 11. Cover 12 is supported in vertically spaced relationship above exhaust opening 11 by means of a number of support brackets 13. Each of the support brackets 13 is connected at one end by conventional bolt connecting means to the exhaust stack and is connected at the opposite ends to the cover means 12. Cover 12 is detailed in design and supported in spaced relationship to allow smoke to be expelled through the opening 11 and outwardly through the space between cover 12 and an upper edge of exhaust stack 10.

As shown in FIG. 1, the fog generating apparatus 20 includes a conduit element 21 which is supported in a vertically oriented relationship above a center portion of cover 12. Conduit 21 is supported by conventional bracket mounting means (not shown) which would be connected around the fog generating supply conduit means and connected to the cover 12 and exhaust stack 10 in a conventional manner. Connected to vertical conduit element 21 is a number of horizontally oriented branched conduits 22. The branch conduits 22 are arranged on vertical conduit 21 in a number of vertical rows with each row being angularly spaced around the vertical conduit approximately 90° relative to an adjacent row. Each of the vertically oriented rows includes a number of horizontally spaced branched conduits 22. Each of the conduits 22 includes a high pressure dispensing nozzle 23 mounted on an extended end thereof. Conduit 20 is connected in fluid flow communication with a high pressure pump and filter means 25 by means of a supply conduit 26.

The pump and filter means 25 are conventional construction detailed to filter smoke residue from water and pump the water with a predetermined pressure upward through the supply conduit 26, vertical conduit element 21 and outwardly through each of the nozzles 23. The nozzles 23 are detailed in construction whereby water forced therethrough will be diffused to generate a moisture laden fog. The angular relationship and vertical spacing of nozzles 23 are detailed whereby the moisture laden fog will be produced in a circular array around and above the exhaust stack 10 and cover 12.

As shown in FIG. 1, a retaining means in the form of a reservoir catch basin 40 is provided around a base portion of exhaust stack 10. Reservoir 40 contains a predetermined amount of water with the pressure pump and filter means 25 being in fluid flow communication with reservoir 40 whereby the reservoir will furnish a supply of water to the pump 25 and fog generating apparatus 20. Reservoir 40 is detailed in horizontal dimensions whereby the moisture laden fog, which is produced by the fog generating means 20 and falling from the atmosphere will be collected by reservoir 40.

Figure 2:
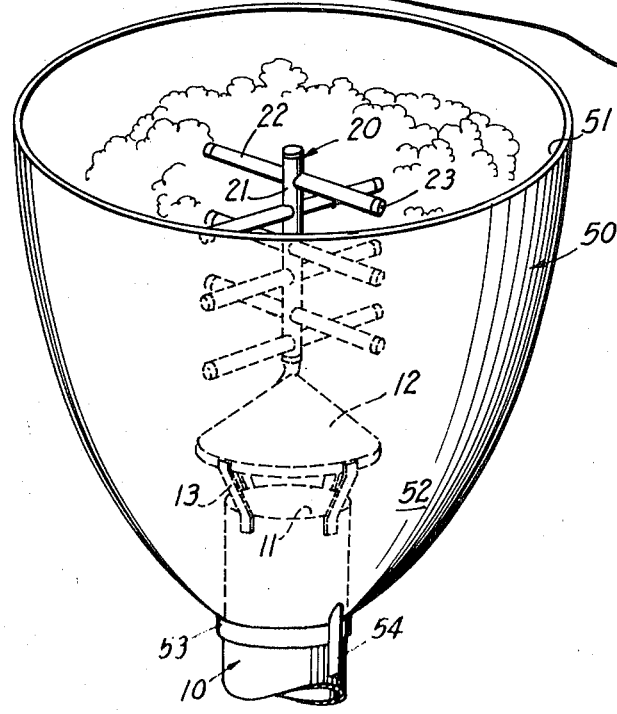
FIG. 2 is a fragmentary perspective view similar to FIG. 1 showing a modified form of the smoke control apparatus.

Referring now particularly to FIG. 2, a modified form of the fog generating retaining means is shown. The modified retaining means includes an upwardly directed funnel shaped element 50. Funnel shaped element 50 includes an upwardly opened exit opening 51 provided with downwardly converging wall surface means 52, which terminate into a mounting bracket 53. Mounting bracket 53 is supported in sealing relationship around the exterior of smoke stack 10 whereby moisture or fog collected in the funnel shaped means 50 will be trapped between the interior of funnel means 50 and the exterior of smoke stack 10, adjacent a lower end of the converging wall 52. Retaining means 50 is connected in fluid flow communication with the pressure pump and filter means 25 by a supply conduit means 54. Supply conduit means 54 is detailed to return any collected moisture in the catch means 50 to the high pressure pump and filter means 25 whereby the collected moisture can be reused in the fog generating apparatus 20.

The funnel shaped retaining means 50 is detailed in design and dimensions to allow smoke expelled through the exhaust opening 11 to be directed outwardly and upward in the funnel shaped retaining means and into the moisture laden fog generated by the fog generating means 20. The vertical dimension of the retaining means 50 is detailed to prevent air currents from carrying the expelled smoke and generated fog outwardly into the atmosphere.

OPERATION

The smoke control apparatus of the present invention is installed on a smoke stack by first mounting the cover means 12 on the smoke stack 10 to prevent moisture from falling into the exhaust opening 11. After the cover 12 has been secured in place, the supply conduit 26 and preassembled smoke generating apparatus 20 is secured in place on the smoke stack 10 above cover 12 as shown in FIG. 1, by conventional support bracket means (not shown). The supply conduit 26 is connected in fluid flow communication with the filter and pump means 25 and with the pump 25 in fluid flow communication with the reservoir retaining means 40.

After the smoke control apparatus has been properly installed, operation thereof is effected by initiating operation of the high pressure pump means 25 which will force water from the reservoir 40 upwardly through supply conduit 26, vertical conduit 20, outwardly through branch conduits 22 and through the high pressure dispensing nozzles 23. Water forced outwardly through the nozzles 23 will create a circular array of moisture laden fog around the smoke stack 10. With the fog generating means 20 in operation, smoke which is expelled through the exhaust opening 11 will be carried outwardly into the moisture laden fog. Smoke traveling outwardly into the moisture laden fog will be saturated causing the smoke residue to fall by gravity into the reservoir retaining means 40, thereby eliminating a transfer of the smoke residue into the atmosphere.

The moisture saturated smoke collected in the reservoir 40 will be returned to the filter and pump means 25, which will remove the smoke residue from the moisture and return the moisture to the fog generating apparatus 20.

The fog generating apparatus is continued in use as long as smoke is being expelled from the stack through exhaust opening 11. After smoke is no longer being exhausted through the exhaust opening 11, a smoke control operation is ceased by stopping pump means 25.

The modified form of the retaining means 50, shown in FIG. 2, will operate in substantially the same manner as the smoke control apparatus of FIG. 1, except that the saturated smoke will only have to fall to the lower portion of the funnel shaped element 50 where it is trapped and conveyed to the pump and filter means 25. The funnel shaped means 50 will be effective in a smoke control operation to prevent the smoke and moisture laden fog from being carried into the atmosphere due to air currents.

The pump 25 can be of any conventional construction capable of intaking water from reservoir 40, filtering the same and forcing the water, under a predetermined amount of pressure, outward through the dispensing nozzles 22 whereby a moisture laden fog will be generated. The conduit means 21, 22 and 26 are constructed of conventional metal stock material. However they could be constructed of suitable synthetic material which would provide the desirable rigid supporting characteristics needed to support the fog generating apparatus in position above the smoke stack.

Even through a reservoir retaining means has been illustrated for use in catching and reusing the moisture, the reservoir or retaining means 40, 50 could be eliminated allowing the saturated smoke to drop to the earth. If a reservoir is eliminated, it would be necessary to provide a supply source for furnishing additional water supply to the pump means 25. Even through the embodiments of FIGS. 1 and 2 illustrate means for catching and reusing the moisture produced by the fog generating means, it is evident that due to certain losses of the moisture into the atmosphere, means must be provided for refurnishing the amount of water in the reservoir 40. Additional water will be supplied to reservoir 40 by conventional supply means (not shown).

It now becomes apparent that the illustrative embodiments described and illustrated herein are capable of obtaining the above stated objects and advantages. It is obvious that those skilled in the art may make modification in the details of construction without departing from the spirit of the invention which is to be limited only by the scope of the appended claims.

What is claimed is:

1. A smoke control apparatus comprising a vertical exhaust stack including an exhaust opening capable of expelling smoke therefrom, a cover supported above and spaced from said exhaust opening, means supported above said cover for expelling moisture horizontally at a high velocity to produce a moisture laden fog through which smoke escaping from said stack must pass, whereby said smoke will be saturated and caused to fall by gravity, said moisture expelling means comprising a vertical pipe and a plurality of horizontal pipes extending radially from said vertical pipe at different elevations with a pipe at one elevation being spaced approximately 90° from a pipe at another elevation, nozzles being provided at the outer end of each of said horizontal pipes with at least one nozzle being provided at each ninety degree interval about said vertical pipe; and a funnel-shaped retaining means sealingly mounted about said stack below said cover and extending upwardly and outwardly to surround the upper end of said stack as well as said cover, said vertical and horizontal pipes and said nozzles.

2. Apparatus as in claim 1 wherein a pump is provided for drawing water from the bottom of said retaining means and spraying it through said nozzle.

3. Apparatus as in claim 2 wherein means is provided for filtering the water drawn from said retaining means and wherein means is also provided for supplying additional water to said retaining means.

4. Apparatus as in claim 1 wherein said vertical pipe is supported centrally on said cover.

* * * * *